US011149190B2

(12) United States Patent
Kalgaonkar et al.

(10) Patent No.: US 11,149,190 B2
(45) Date of Patent: Oct. 19, 2021

(54) COMPOSITIONS AND METHODS FOR ACID DIVERSION DURING ACID STIMULATION OF SUBTERRANEAN FORMATIONS

(71) Applicant: Saudi Arabian Oil Company, Dhahran (SA)

(72) Inventors: Rajendra Arunkumar Kalgaonkar, Abqaiq (SA); Qasim Sahu, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 56 days.

(21) Appl. No.: 16/555,436

(22) Filed: Aug. 29, 2019

(65) Prior Publication Data

US 2021/0062075 A1 Mar. 4, 2021

(51) Int. Cl.
*C09K 8/78* (2006.01)
*C09K 8/72* (2006.01)
*C09K 8/76* (2006.01)
*C09K 8/92* (2006.01)

(52) U.S. Cl.
CPC ............... *C09K 8/78* (2013.01); *C09K 8/725* (2013.01); *C09K 8/76* (2013.01); *C09K 8/92* (2013.01)

(58) Field of Classification Search
None
See application file for complete search history.

(56) References Cited

U.S. PATENT DOCUMENTS

| | | | |
|---|---|---|---|
| 7,621,334 B2 | 11/2009 | Welton et al. | |
| 10,233,380 B1 | 3/2019 | Wagle et al. | |
| 2008/0277116 A1* | 11/2008 | Roddy | C04B 28/02 166/292 |
| 2009/0236097 A1* | 9/2009 | Roddy | E21B 33/14 166/293 |
| 2010/0016183 A1* | 1/2010 | Roddy | C09K 8/518 507/225 |
| 2010/0096135 A1* | 4/2010 | Roddy | C04B 20/008 166/293 |
| 2014/0116695 A1* | 5/2014 | Maghrabi | C09K 8/74 166/279 |
| 2014/0131042 A1* | 5/2014 | Nguyen | C09K 8/80 166/280.2 |
| 2016/0168443 A1* | 6/2016 | Lafitte | C09K 8/68 507/112 |
| 2018/0223148 A1 | 8/2018 | Wagle et al. | |
| 2018/0346797 A1 | 12/2018 | Kalgaonkar et al. | |
| 2019/0145222 A1 | 5/2019 | Wagle et al. | |

FOREIGN PATENT DOCUMENTS

| | | |
|---|---|---|
| AU | 2014412067 B2 | 5/2016 |
| WO | 2017111893 A1 | 6/2017 |
| WO | 2018106259 A1 | 6/2018 |

OTHER PUBLICATIONS

Lynn et al., "A core based comparison of the reaction characteristics of emulsified and in-situ gelled acids in low permeability, high temperature, gas bearing carbonates", Society of Petroleum Engineers, Inc., PSE 65386, pp. 1-16, 2001.
International Search Report and Written Opinion dated Apr. 24, 2020 pertaining to International application PCT/US2019/068248 filed Dec. 23, 2019, 14 pgs.

* cited by examiner

*Primary Examiner* — John J Figueroa
(74) *Attorney, Agent, or Firm* — Dinsmore & Shohl LLP

(57) ABSTRACT

Treatment fluids for acid diversion during acid stimulation of a subterranean formation may include at least an acidizing fluid, a nanoparticle dispersion, and an activator. The treatment fluid may include from 40 weight percent to 70 weight percent acidizing fluid based on the total weight of the treatment fluid. The treatment fluid may include from 20 weight percent to 40 weight percent nanoparticle dispersion based on the total weight of the treatment fluid. The treatment fluid may include from 5 weight percent to 15 percent activator based on the total weight of the treatment fluid. Methods of treating a subterranean formation with the treatment fluids are also disclosed.

20 Claims, No Drawings

COMPOSITIONS AND METHODS FOR ACID DIVERSION DURING ACID STIMULATION OF SUBTERRANEAN FORMATIONS

BACKGROUND

Field

The present disclosure relates to natural resource well drilling and hydrocarbon production from subterranean formations and, more specifically, to methods and compositions for acid diversion during acid stimulation of subterranean formations.

Technical Background

The discovery and extraction of hydrocarbons, such as oil or natural gas, from subterranean formations, may be impeded for a variety of reasons, such as inherently poor permeability or damage to the subterranean formation. As a result, the production rate of hydrocarbons from a hydrocarbon-producing region of the subterranean formation may be reduced compared to the expected production rate. In these instances, methods for enhancing recovery from the hydrocarbon-producing regions of the subterranean formation can be utilized to improve hydrocarbon production.

Methods for obtaining enhanced oil recovery from a hydrocarbon-producing region of the subterranean formation may include acid stimulations in which an acid solution is injected into the subterranean formation to increase permeability, which may stimulate the production of hydrocarbons from the subterranean formation. In particular, the acid solution may react with the rock of the subterranean formation to increase the porosity of the subterranean formation and produce pathways for conducting hydrocarbons from a hydrocarbon-producing region of the subterranean formation to the wellbore. Conventional treatment fluids for conducting acid diversion during acid stimulations may include polymeric systems for increasing the viscosity of the treatment fluids to divert subsequently introduced acid solutions to less permeable regions of the subterranean formation. However, these polymeric systems can cause blockage or damage to the subterranean formation during flow back due to large polymeric molecules remaining in the treatment fluid.

SUMMARY

Accordingly, there is an ongoing need for compositions and methods for acid diversion during acid stimulation of a subterranean formation. The compositions and methods of the present disclosure include a treatment fluid that comprises an acidizing fluid, a nanoparticle dispersion, and an activator. The activity of the nanoparticle dispersion and the activator may be temperature and pH dependent. Due to the temperature dependence, the viscosity of the treatment fluid may not increase until the treatment fluid is injected into the subterranean formation, reducing the energy required to conduct the acid diversion. Upon injection into the subterranean formation, the temperature of the treatment fluid may increase, which may cause interaction between the activator and the nanoparticles of the nanoparticle dispersion that may increase the viscosity of the treatment fluid. The increased viscosity may operate to divert subsequently introduced treatment fluids to less permeable regions of the subterranean formation. As the acid in the treatment fluid reacts with the rock of the subterranean formation and is consumed, the pH of the treatment fluid may increase. The increase in pH may cause the viscosity of the treatment fluid to decrease. The decrease in viscosity may enable the treatment fluid to flow back with little risk of blocking the pores of the subterranean formation or causing formation damage.

According to one or more embodiments of the present disclosure, a treatment fluid for acid diversion during acid stimulation of a subterranean formation may include from 40 weight percent (wt. %) to 70 wt. % acidizing fluid based on the total weight of the treatment fluid, from 20 wt. % to 40 wt. % nanoparticle dispersion based on the total weight of the treatment fluid, and from 5 wt. % to 15 wt. % activator based on the total weight of the treatment fluid.

According to one or more additional embodiments of the present disclosure, a method for acid diversion during acid stimulation of a subterranean formation may include introducing a treatment fluid into the subterranean formation. The treatment fluid may include an acidizing fluid, a nanoparticle dispersion, and an activator. A temperature of the subterranean formation may cause interaction of the activator with the nanoparticle dispersion to increase the viscosity of the treatment fluid to create a barrier operable to divert subsequently injected treatment fluid to other regions of the subterranean formation.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

DETAILED DESCRIPTION

The present disclosure is directed to compositions and methods for acid diversion during acid stimulation of a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface. This initial stage of production is referred to as "primary recovery."

In primary recovery, natural formation energy, such as gasdrive, waterdrive, or gravity drainage, displaces hydrocarbons from the subterranean formation into the wellbore and up to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons toward the wellbore and up to the surface. However, as the formation pressure decreases due to hydrocarbon production, the differential pressure also decreases. The primary recovery stage reaches its limit when the formation pressure is reduced to the point that the hydrocarbon production rates are no longer economical or when the proportions of gas or water in the production stream increase to the point that further primary recovery is no longer economical. During primary recovery, only a minority percentage of the total initial hydrocarbons in the subterranean formation are extracted (typically around 10 percent (%) by volume for hydrocarbon-containing subterranean formations).

During a second recovery stage of hydrocarbon production, an external fluid such as water or gas may be injected into the subterranean formation through injection wells positioned in rock that is in fluid communication with production wells. As used in the present disclosure, the term "injection well" may refer to a well in which fluids are injected into the subterranean formation rather than produced from the subterranean formation. Secondary recovery may operate to maintain formation pressure and to displace hydrocarbons toward the wellbore. The secondary recovery stage reaches its limit when the injected fluid (water or gas) is produced from the production well in amounts sufficient such that the production of hydrocarbons is no longer economical. The successive use of primary recovery and secondary recovery in a hydrocarbon-producing subterranean formation produces, on average, 15% to 40% by volume of the original hydrocarbons in place. This indicates that a significant amount of hydrocarbons remains in the subterranean formation after primary and secondary recovery.

Acid stimulation can be used during or after primary or secondary recovery to increase the hydrocarbon yield from the subterranean formation. As used in the present disclosure, the term "acid stimulation" or "matrix stimulation" may refer to the treatment of a subterranean formation with a treatment fluid containing an acid that reacts with the subterranean formation. A "fluid" may include liquids, gases, or both. In some subterranean formations, such as sandstone formations, the acid may react with the soluble substances in the formation matrix to enlarge the pore spaces. In other subterranean formations, such as carbonate formations, the acid may dissolve portions of the rock formation matrix. In each case, the treatment fluid of the acid stimulation reacts with the rock of the subterranean formation to increase the porosity of the subterranean formation and produce pathways for conducting hydrocarbons from a hydrocarbon-producing region of the subterranean formation to the wellbore.

However, when the treatment fluid is not sufficiently viscous, the acid of the treatment fluid may preferentially flow into regions of greatest permeability in the subterranean formation and may fail to penetrate significant portions of the subterranean formation having lesser permeability. As a result, a treatment fluid that is not sufficiently viscous may fail to produce conductive pathways in less permeable regions of the subterranean formation and, as such, may fail to sufficiently increase the permeability of a majority of the subterranean formation. Conventional treatment fluids may include polymeric systems having a pH dependent crosslinking mechanism. As the acid of the treatment fluid flows into the relatively permeable regions of subterranean formation and reacts with the rock, the pH of the treatment fluid increases and the polymeric system may crosslink to increase the viscosity of the treatment fluid. The increased viscosity of the treatment fluid may divert subsequently introduced treatment fluid to less permeable regions of the subterranean formation. This "acid diversion" may increase the penetration and volumetric sweep of the acid stimulation and may facilitate the formation of conductive pathways in a greater portion of the subterranean formation. However, these polymeric systems may not entirely de-crosslink after the acid stimulation and, as a result, large polymeric molecules may remain in the treatment fluid after the acid stimulation is complete. These large polymeric molecules can cause blockage or damage to the formation during flow back of the treatment fluids to the wellbore.

The present disclosure is directed to treatment fluids for acid diversion during acid stimulation of a subterranean formation. The treatment fluids of the present disclosure may include at least an acidizing fluid, a nanoparticle dispersion, and an activator. The treatment fluid may include from 40 wt. % to 70 wt. % acidizing fluid based on the total weight of the treatment fluid. The treatment fluid may include from 20 wt. % to 40 wt. % nanoparticle dispersion based on the total weight of the treatment fluid. The treatment fluid may include from 5 wt. % to 15 wt. % activator based on the total weight of the treatment fluid. The nanoparticle dispersion may include an aqueous dispersion of silica nanoparticles, and the activator may include one or more of poly(2-hydroxypropyl-1-N-dimethyl ammonium chloride), poly(2-hydroxypropyl-1-1-N-dimethyl ammonium chloride), poly[N-(dimethylaminomethyl)]-acrylamide, poly(2-vinylimidazolinium bisulfate), poly(diallyldimethylammoniumchloride), or poly(N-dimethylaminopropyl)-methacrylamide.

The treatment fluids of the present disclosure may enable acid diversion during acid stimulation of a subterranean formation to effectively increase the permeability of the subterranean formation and increase the production of hydrocarbons from the subterranean formation. When exposed to downhole conditions, the nanoparticle dispersion and the activator may interact to increase the viscosity of the treatment fluid as the temperature of the treatment fluid increases. This increase in viscosity may divert subsequent portions of the treatment fluid away from relatively permeable portions of the subterranean formation that have already been treated and to less permeable regions of the subterranean formation. This acid diversion may result in a greater increase in the permeability of the subterranean formation when compared to conventional acid stimulation treatment fluids. As the acidizing fluid reacts with the rock of the subterranean formation and the pH of the treatment fluid increases, the interaction between the nanoparticle dispersion and the activator may decrease, and the viscosity of the treatment fluid may decrease. This decrease in viscosity may enable the treatment fluid to flow back to the wellbore or injection well with reduced risk of blocking the pores of the subterranean formation or causing damage to the subterranean formation compared to existing acid diversion treatments.

The acidizing fluid may include an aqueous acid solution. The aqueous acid solution may include one or a plurality of strong acids, weak acids, or both, in an aqueous phase. As used in the present disclosure, the term "strong acid" may refer to any acid with a logarithmic acid dissociation constant ($pK_a$) value that is less than or equal to 1.0 and the term "weak acid" may refer to any acid with a $pK_a$ value that is greater than 1.0. Strong acids in the acidizing fluid may include, but are not limited to, hydrochloric acid, nitric acid, sulfuric acid, or combinations of these. Weak acids in the acidizing fluid may include, but are not limited to, acetic acid, formic acid, hydrofluoric acid, fluoroboric acid, or combinations of these. In some embodiments, the acidizing fluid may include from 10 volume percent (vol. %) to 40 vol. % of one or a plurality of strong acids, weak acids, or both, based on the total volume of the acidizing fluid. For example, the acidizing fluid may include from 10 vol. % to 35 vol. %, from 10 vol. % to 30 vol. %, from 10 vol. % to 25 vol. %, from 10 vol. % to 20 vol. %, from 10 vol. % to 15 vol. %, from 15 vol. % to 40 vol. %, from 15 vol. % to 35 vol. %, from 15 vol. % to 30 vol. %, from 15 vol. % to 25 vol. %, from 15 vol. % to 20 vol. %, from 20 vol. % to 40 vol. %, from 20 vol. % to 35 vol. %, from 20 vol. % to 30 vol. %, from 20 vol. % to 25 vol. %, from 25 vol. % to 40 vol. %, from 25 vol. % to 35 vol. %, from 25 vol. % to 30 vol. %, from 30 vol. % to 40 vol. %, from 30 vol. % to 35 vol. %, or from 35 vol. % to 40 vol. % acids (including strong acids, weak acids, or both) based on the total volume of the acidizing fluid. In some embodiments, the acidizing fluid may include an aqueous solution of hydrochloric acid. The aqueous phase may include at least one of fresh water, salt water, brine, municipal water, formation water, produced water, well water, filtered water, distilled water, sea water, or combinations thereof.

The acidizing fluid may be operable to react with the rock of a subterranean formation. For example, the acidizing fluid may include an aqueous solution of hydrochloric acid that may react with the calcium carbonate of a subterranean formation to form pathways, commonly referred to as "wormholes," through the subterranean formation. The reaction of the acidizing fluid with the rock of a subterranean formation may increase the permeability of the subterranean formation. As used in the present disclosure, the term "permeability" may refer to the ability, or measurement of a rock's ability, to transmit fluids. The permeability of a subterranean formation is typically measured in darcies or millidarcies (mD). The permeability may be determined by testing a core sample from the subterranean formation according to the test methods described in American Petroleum Institute (API) Recommended Practice 40. Other methods for determining permeability, such as, but not limited to, methods based on measuring sidewall samples, interpreting nuclear magnetic resonance (NMR) data, or analyzing drill log data, may also be used to determine or estimate permeability. The ability of the subterranean formation to transmit fluids, such as hydrocarbons, may be increased, which may improve the overall hydrocarbon production capabilities of the subterranean formation compared to the production of hydrocarbons without acid stimulation of the subterranean formation.

The treatment fluid of the present disclosure may include an amount of the acidizing fluid sufficient to reduce the pH of the treatment fluid to within a range of from 2.0 to 4.0. The treatment fluid may include an amount of the acidizing fluid sufficient to increase the permeability of the subterranean formation. In some embodiments, the treatment fluid may include from 40 wt. % to 70 wt. % acidizing fluid based on the total weight of the treatment fluid. For example, the treatment fluid may include from 45 wt. % to 70 wt. %, from 50 wt. % to 70 wt. %, from 55 wt. % to 70 wt. %, from 60 wt. % to 70 wt. %, from 65 wt. % to 70 wt. %, from 40 wt. % to 65 wt. %, from 40 wt. % to 60 wt. %, from 40 wt. % to 55 wt. %, from 40 wt. % to 50 wt. %, or from 40 wt. % to 45 wt. % acidizing fluid based on the total weight of the treatment fluid. When the treatment fluid includes less than 40 wt. % acidizing fluid, the amount of the acidizing fluid in the treatment fluid may not be sufficient to treat the subterranean formation to increase the permeability. Conversely, when the treatment fluid includes more than 70 wt. % acidizing fluid, the treatment fluid may not contain sufficient amounts of the nanoparticle dispersion and activator to increase the viscosity of the treatment fluid such that subsequently injected treatment fluid is diverted away from portions of the subterranean formation that have already been treated.

As previously discussed in this disclosure, the treatment fluid can include a nanoparticle dispersion. The nanoparticle dispersion may include a plurality of nanoparticles dispersed in a solvent. As used in the present disclosure, the term "nanoparticle" may refer to a particle or inorganic material having a particle size of from 1 nanometer (nm) to 100 nm. The nanoparticles in the nanoparticle dispersion may include, but are not limited to, silica ($SiO_2$) nanoparticles. The nanoparticle dispersion may be an aqueous nanoparticle dispersion in which the solvent is water. The water in the aqueous nanoparticle dispersion may include at least one of fresh water, salt water, brine, municipal water, formation water, produced water, well water, filtered water, distilled water, sea water, or combinations thereof. In one or more embodiments, the nanoparticle dispersion may include an aqueous dispersion of silica nanoparticles.

In some embodiments, the nanoparticle dispersion may include silica in an amount sufficient to interact with the activator to increase the viscosity of the treatment fluid. In some embodiments, the nanoparticle dispersion may include from 1 wt. % to 50 wt. % silica based on the total weight of the nanoparticle dispersion. For example, the nanoparticle dispersion may include from 5 wt. % to 45 wt. %, from 10 wt. % to 40 wt. %, from 15 wt. % to 35 wt. %, or from 20 wt. % to 30 wt. % silica based on the total weight of the nanoparticle dispersion.

In some embodiments, the nanoparticle dispersion may include silica nanoparticles having a Brunauer Emmett Teller (BET) surface area sufficient to facilitate the adsorption of a cationic species on the surface of the silica nanoparticles. In some embodiments, the nanoparticle dispersion may include silica nanoparticles having a BET surface area of from 100 square meters per gram ($m^2/g$) to 300 $m^2/g$. As used in the present disclosure, the term "BET surface area" may refer to the average surface area of the silica nanoparticles as measured by the multipoint BET nitrogen absorption method according to ASTM D-1993. In some embodiments, the silica nanoparticles may have a BET surface area of from 110 $m^2/g$ to 290 $m^2/g$, from 120 $m^2/g$ to 280 $m^2/g$, from 130 $m^2/g$ to 270 $m^2/g$, from 140 $m^2/g$ to 260 $m^2/g$, from 150 $m^2/g$ to 250 $m^2/g$, from 160 $m^2/g$ to 240 $m^2/g$, from 170 $m^2/g$ to 230 $m^2/g$, from 180 $m^2/g$ to 220 $m^2/g$, or from 190 $m^2/g$ to 210 $m^2/g$. Silica nanoparticles having an increased BET surface area may facilitate the adsorption of cationic species on the surface of the silica nanoparticles, as discussed subsequently.

In one or more embodiments, the nanoparticle dispersion may be stabilized. As used in the present disclosure, the term "stabilized" may refer to a reduction in attractive interactions between nanoparticles that may cause the nanoparticles to form agglomerates and the nanoparticle dispersion to coalesce. Nanoparticles in a dispersion medium typically display Brownian motion and, as such, the silica nanoparticles of the nanoparticle dispersion may frequently collide. The stability of the nanoparticle dispersion is determined by the interaction between the silica nanoparticles during such collisions. The stabilization of the nanoparticle dispersion may reduce or eliminate attractive interactions between the silica nanoparticles during such collisions and prevent the silica nanoparticles from adhering to one another, which causes the nanoparticle dispersion to coalesce.

In one or more embodiments, the nanoparticle dispersion may be oxychloride stabilized. As used in the present disclosure, the term "oxychloride stabilized" may refer to nanoparticle dispersions that include silica nanoparticles that have been modified by an oxychloride species and are stabilized by cationic species present in the dispersion. As used in the present disclosure, the term "modified" may refer to a species absorbed onto the surface of the silica nanoparticles. Without being bound by any particular theory, the oxychloride species and the cationic species may create a charge-neutral layer around the silica nanoparticles. These charge-neutral layers may create a mutual repulsion effect between the silica nanoparticles and prevent adhering of the silica nanoparticles to each other to form larger agglomerates that are no longer nanoparticles.

In one or more other embodiments, the nanoparticle dispersion may be stabilized by modifying the silica nanoparticles with a cationic modifier. The silica nanoparticles modified by cationic modifiers may be stabilized by anions present in the dispersion. Cationic modifiers may include, but are not limited to, one or more of a cationic aluminum species, a cationic iron species, a cationic polymer, or combinations of these. Cationic aluminum species may include, but are not limited to, aluminum oxide ($Al_2O_3$), aluminum sulfates ($Al_2(SO_4)^{3-}$), or combinations of cationic aluminum species. Cationic iron species may include, but are not limited to, iron chloride ($FeCl_3$), iron sulfates ($Fe_2(SO_4)^{3-}$), or combinations of cationic iron species. The cationic polymer may include a polymer having at least one positively charged center, such as an ammonium cation, a phosphonium cation, a guanidinium cation, another positively charged species, or combinations of these. The cationic polymer may include, but is not limited to, one or more of poly(2-hydroxypropyl-1-N-dimethylammonium chloride), poly(2-dimethylamino)ethyl methacrylate) methyl chloride quaternary salt, quaternized poly(N-dimethylaminopropyl)-methacrylamide, poly(2-hydroxypropyl-1-1-N-dimethylammoniumchloride), poly[N-(dimethylaminomethyl)]-acrylamide, poly(2-vinylimidazolinium bisulfate), or combinations of these cationic polymers. Without being bound by any particular theory, it is believed that the cationic modifier on the surface of the silica nanoparticles and the anions in the dispersion may create a charge-neutral layer around the silica nanoparticles. These charge-neutral layers may produce a mutual repulsion effect between the silica nanoparticles and prevent adhering of the silica nanoparticles to each other to form larger agglomerates.

In some embodiments, the nanoparticle dispersion may include the cationic modifier in an amount sufficient to stabilize the nanoparticle dispersion. In some embodiments, the nanoparticle dispersion may include from 0.1 wt. % to 5 wt. % cationic modifier based on the total weight of the nanoparticle dispersion. For example, the nanoparticle dispersion may include from 0.5 wt. % to 5 wt. %, from 1 wt. % to 5 wt. %, from 2 wt. % to 5 wt. %, from 3 wt. % to 5 wt. %, from 4 wt. % to 5 wt. %, from 0.1 wt. % to 4 wt. %, from 0.1 wt. % to 3 wt. %, from 0.1 wt. % to 2 wt. %, from 0.1 wt. % to 1 wt. %, or from 0.1 wt. % to 0.5 wt. % cationic modifier based on the total weight of the nanoparticle dispersion. Nanoparticle dispersions having less than 0.1 wt. % cationic modifier may not stabilize and, as a result, the nanoparticles may form agglomerates and the nanoparticle dispersion may coalesce.

Due to the presence of ions in nanoparticle dispersions that are stabilized, the nanoparticle dispersion may have increased acidity. In some embodiments, the pH of the nanoparticle dispersion may be less than or equal to 4.0. For example, the pH of the nanoparticle dispersion may be from 2.0 to 4.0, from 2.4 to 4.0, from 2.6 to 4.0, from 2.8 to 4.0, from 3.0 to 4.0, from 3.2 to 4.0, from 3.4 to 4.0, from 3.6 to 4.0, from 3.8 to 4.0, from 2.0 to 3.8, from 2.0 to 3.6, from 2.0 to 3.4, from 2.0 to 3.2, from 2.0 to 3.0, from 2.0 to 2.8, from 2.0 to 2.6, from 2.0 to 2.4, or from 2.0 to 2.2. When the pH of the nanoparticle dispersion exceeds 4.0, the counterions of the nanoparticle dispersion may no longer form a charge-neutral layer around the silica nanoparticles and the nanoparticle dispersion may no longer be stabilized. As a result, the dispersion may coalesce when the pH of the nanoparticle dispersion exceeds 4.0.

In some embodiments, the density of the nanoparticle dispersion may be suitable to maintain the stability of the nanoparticle dispersion. In some embodiments, the density of the nanoparticle dispersion may be from 0.5 grams per cubic centimeter ($g/cm^3$) to 1.5 $g/cm^3$. For example, the density of the nanoparticle dispersion may be from 0.6 $g/cm^3$ to 1.4 $g/cm^3$, from 0.7 $g/cm^3$ to 1.3 $g/cm^3$, from 0.8 $g/cm^3$ to 1.2 $g/cm^3$, or from 0.9 $g/cm^3$ to 1.1 $g/cm^3$. Without being bound by any particular theory, it is believed that when the density of the nanoparticle dispersion is greater than 1.5 $g/cm^3$, the long term stability of the nanoparticle dispersion may be negatively affected.

In some embodiments, the viscosity of the nanoparticle dispersion may facilitate the pumping of the treatment fluid into the subterranean formation. In some embodiments, the viscosity of the nanoparticle dispersion may be from 1.0 centipoise (cP) to 5.0 cP. For example, the viscosity of the nanoparticle dispersion may be from 1.5 cP to 4.5 cP, from 2.0 cP to 4.0 cP, or from 2.5 cP to 3.5 cP. In some embodiments, the viscosity nanoparticle dispersion may, at least in part, determine the viscosity of the treatment fluid. In some embodiments, the initial viscosity of the treatment fluid may be less than or equal to 10 cP. As used in the present disclosure, the term "initial viscosity" may refer to the viscosity of the treatment fluid before exposure to downhole conditions, such as the viscosity of the treatment fluid before or during injection, as measured by a viscometer (commercially available as Model 35 from Fann) at a shear rate of 170 inverse seconds ($s^{-1}$). For example, the initial viscosity of the treatment fluid during injection may be from 1 cP to 10 cP, from 2 cP to 10 cP, from 5 cP to 10 cP, from 7 cP to 10 cP, from 9 cP to 10 cP, from 1 cP to 9 cP, from 1 cP to 7 cP, from 1 cP to 5 cP, or from 1 cP to 2 cP. When the viscosity of the nanoparticle dispersion is greater than 5.0 cP, the viscosity of the treatment fluid may be too great to effectively pump and inject the nanoparticle dispersion into the subterranean formation at a sufficient rate.

In some embodiments, the treatment fluid may include nanoparticle dispersion in an amount sufficient to increase the viscosity of the treatment fluid such that subsequently injected treatment fluid may be diverted. In some embodiments, the treatment fluid may include from 20 wt. % to 40 wt. % nanoparticle dispersion based on the total weight of the treatment fluid. For example, the treatment fluid may include from 20 wt. % to 35 wt. %, from 20 wt. % to 30 wt. %, from 20 wt. % to 25 wt. %, from 25 wt. % to 40 wt. %, from 25 wt. % to 35 wt. %, from 25 wt. % to 30 wt. %, from 30 wt. % to 40 wt. %, from 30 wt. % to 35 wt. %, or from 35 wt. % to 40 wt. % nanoparticle dispersion based on the total weight of the treatment fluid. When the treatment fluid includes less than 20 wt. % nanoparticle dispersion, the nanoparticle dispersion may become too dilute within the treatment fluid and may fail to sufficiently increase the viscosity of the treatment fluid. In some embodiments, the treatment fluid may include a weight ratio of the nanoparticle dispersion to the acidizing fluid of from 90:10 to 50:50. For example, the treatment fluid may include nanoparticle dispersion and acidizing fluid in a weight ratio of from 80:20 to 50:50, from 70:30 to 50:50, from 60:40 to 50:50, from 90:10 to 60:40, from 90:10 to 70:30, or from 90:10 to 80:20.

In one or more embodiments, the treatment fluid may include an activator. In embodiments where the nanoparticle dispersion is oxychloride stabilized, the activator may include a cationic polymer. For example, the activator may include, but is not limited to, one or more of poly(2-hydroxypropyl-1-N-dimethyl ammonium chloride), poly(2-hydroxypropyl-1-1-N-dimethyl ammonium chloride), poly[N-(dimethylaminomethyl)]-acrylamide, poly(2-vinylimidazolinium bisulfate), poly(diallyldimethylammoniumchloride), poly(N-dimethylaminopropyl)-methacrylamide, or combinations of these activators. In embodiments where the nanoparticle dispersion is stabilized by modification of the silica nanoparticles with a cationic modifier, the activator may include, but is not limited to an ionic strength modifier. As used in the present disclosure, an "ionic strength modifier" may be any ionic compound that is operable to increase the concentration of ions within the nanoparticle dispersion. For example, the ionic strength modifier may be an alkali metal salt, such as sodium chloride.

When heated to a sufficient triggering temperature, the activator may react with the nanoparticle dispersion to increase the viscosity of the treatment fluid. Without being bound by any particular theory, it is believed that the activators may prevent the counterions of the nanoparticle dispersion from forming a charge-neutral layer around the silica nanoparticles and allow the dispersion to coalesce and form a silica gel. This increase in viscosity of the treatment fluid may divert portions of the acidizing fluid away from portions of the subterranean formation that have already been treated. Acid diversion may prevent the acidizing fluid from only reacting with the relatively permeable portions of the subterranean formation and result in the formation of deeper and larger conductive pathways when compared to treatment fluids having lesser viscosities. In some embodiments, the treatment fluid may be heated to a sufficient triggering temperature when exposed to downhole conditions. As used in the present disclosure, the term "downhole conditions" may refer, at least in part, to the temperature of the subterranean formation undergoing acid stimulation. In some embodiments, when the treatment fluid is heated to a temperature of at least 200 degrees Celsius (° C.), the activator and the nanoparticle dispersion may interact and increase the viscosity of the treatment fluid.

In some embodiments, the treatment fluid may include an activator in an amount sufficient to increase the viscosity of the treatment fluid such that subsequently injected treatment fluid may be diverted. In some embodiments, the treatment fluid may include from 5 wt.% to 15 wt.% activator based on the total weight of the treatment fluid. For example, the treatment fluid may include from 7 wt.% to 15 wt.%, from 9 wt.% to 15 wt.%, from 11 wt.% to 15 wt.%, from 13 wt.% to 15 wt.%, from 5 wt.% to 13 wt.%, from 5 wt.% to 11 wt.%, from 5 wt.% to 9 wt.%, or from 5 wt.% to 7 wt.% activator based on the total weight of the treatment fluid. When the treatment fluid includes less than 5 wt.% activator, the amount of activator may not be sufficient to interact with the nanoparticle dispersion and, as a result, the viscosity of the treatment fluid may not increase enough to divert subsequently injected treatment fluid.

As described previously, the treatment fluid may improve the effectiveness of acid stimulation treatments of subterranean formations by diverting acidizing fluids to less permeable regions of the subterranean formation. Accordingly, in one or more embodiments the treatment fluid may be introduced into a subterranean formation. In some embodiments, the treatment fluid may be injected into the subterranean formation through the wellbore of a production well. In some embodiments, the treatment fluid may be injected into the subterranean formation through the wellbore of an injection well. In some embodiments, the treatment fluid may be injected using the production tubing of the wellbore and, in some embodiments, the treatment fluid may be injected using a coiled tubing.

In some embodiments, the injection of the treatment fluid into the subterranean formation may include pumping a displacement fluid, also referred to as a flush fluid, into the wellbore after the treatment fluid. The displacement fluid may force the treatment fluid from the wellbore into the subterranean formation. The displacement fluid may be pumped into the wellbore until all, or nearly all, of the treatment fluid has been forced into the subterranean formation. In some embodiments, the treatment fluid may be incompatible with fluids already present within the wellbore, such as a drilling fluid. In some embodiments, a spacer fluid may be pumped into the wellbore prior to the injection of the treatment fluid. The spacer fluid may provide separation between a fluid already present within the wellbore and the treatment fluid.

Once injected into the subterranean formation, the acidizing fluid of the treatment fluid may react with the rock of the subterranean formation to increase the porosity of the subterranean formation and produce pathways for conducting hydrocarbons from a hydrocarbon-producing region of the subterranean formation to the wellbore. After being exposed to downhole conditions, the treatment fluid may begin to increase in temperature. As described previously, this may cause the nanoparticle dispersion and the activator to interact and increase the viscosity of the treatment fluid. In one or more embodiments, the viscosity of the treatment fluid may increase from an initial viscosity to a treatment viscosity. In embodiments, the treatment viscosity may be greater than or equal to 200 cP. For example, the treatment viscosity of the treatment fluid may be from 200 cP to 1000 cP, from 400 cP to 1000 cP, from 600 cP to 1000 cP, from 800 cP to 1000 cP, from 200 cP to 800 cP, from 200 cP to 600 cP, or from 200 cP to 400 cP. The treatment viscosity of the treatment fluid may be sufficient to create a barrier operable to divert subsequent fluid, such as additional treatment fluid, to other regions of the subterranean formation. For example, subsequent portions of acidizing fluid present in the treatment fluid may be diverted away from portions of the subterranean formation that have already reacted with the treatment fluid, such as relatively permeable regions, to less permeable regions of the subterranean formation. This acid diversion may result in a greater increase of the permeability of the subterranean formation when compared to a treatment fluid that remains a lesser viscosity, as discussed previously in the present disclosure.

As the acid stimulation nears completion, the viscosity of the treatment fluid may decrease and approach the initial viscosity of the treatment fluid. As the acidizing fluid reacts with the rock of the subterranean formation, the acid may be consumed and the pH of the treatment fluid may increase. This increase in pH may inhibit the activity between the nanoparticle dispersion and the activator and may cause a subsequent decrease in viscosity of the treatment fluid. In one or more embodiments, the viscosity of the treatment fluid may decrease from a treatment viscosity to a post-treatment viscosity. In embodiments, the post-treatment viscosity may be less than or equal to 50 cP. For example, the post-treatment viscosity of the treatment fluid may be from 10 cP to 50 cP, from 20 cP to 50 cP, from 30 cP to 50 cP, from 40 cP to 50 cP, from 10 cP to 40 cP, from 10 cP to 30 cP, or from 10 cP to 20 cP.

In some embodiments, flow back may facilitate removal of the treatment fluid from the subterranean formation. The treatment fluid may be transmitted from the subterranean formation back into the wellbore. Due to its decreased viscosity, as discussed previously, the treatment fluid may be removed from the subterranean formation without blocking pores of the subterranean formation or causing damage to the subterranean formation. Once the treatment fluid has been transmitted from the subterranean formation back into the wellbore, the treatment fluid may be conveyed from the wellbore to the surface.

EXAMPLES

The various embodiments of compositions and methods for acid diversion during an acid stimulation treatment of a subterranean formation will be further clarified by the following example. The example is illustrative in nature, and should not be understood to limit the subject matter of the present disclosure.

Example 1

A treatment fluid was prepared by mixing 50 milliliters (mL) of an aqueous solution of 28 wt. % hydrochloric acid, 10 mL of an aqueous solution of 10 wt. % poly(diallyldimethylammoniumchlroide), and 25 mL of a nanoparticle dispersion. The nanoparticle dispersion of Example 1 was CS30-516P silica nanoparticle dispersion obtained from Akzo Nobel (Amsterdam, Netherlands). The initial viscosity of the treatment fluid was measured to be approximately 10 cP. In order to simulate downhole conditions and promote interaction between the nanoparticle dispersion and the activator, the treatment fluid was then heated in an oven at 200 degrees ° C. for 15 minutes. The viscosity of the viscosified treatment fluid was measured to be approximately 1000 cP. In order to simulate the reaction of the treatment fluid with the rock of a subterranean formation, calcium carbonate was then added to the viscosified treatment fluid under continuous stirring. Calcium carbonate was added to the viscosified treatment fluid until a pH of approximately 5 was achieved. The viscosity of the deactivated treatment fluid was measured to be approximately 30 cP.

This indicates that the treatment fluid is capable of sufficient acid diversion during an acid stimulation treatment as well as easy flow back after the treatment is complete. In particular, when exposed to temperatures that simulate downhole conditions, the treatment fluid displayed an increase in viscosity of over 9000 percent (%). That is, the treatment fluid displayed a sufficient increase in viscosity to effectively divert subsequently introduced fluids. Further, as the acidizing fluid present in the treatment fluid reacted with the calcium carbonate, the viscosity of the treatment fluid decreased back to levels near the initial viscosity.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims and their equivalents.

In a first aspect of the present disclosure, a treatment fluid for acid diversion during an acid stimulation of a subterranean formation includes from 40 weight percent to 70 weight percent acidizing fluid based on the total weight of the treatment fluid; from 20 weight percent to 40 weight percent nanoparticle dispersion based on the total weight of the treatment fluid; and from 5 weight percent to 15 weight percent activator based on the total weight of the treatment fluid.

A second aspect of the present disclosure may include the first aspect where the nanoparticle dispersion comprises an aqueous dispersion of silica nanoparticles.

A third aspect of the present disclosure may include the second aspect where the nanoparticle dispersion comprises from 1 weight percent to 50 weight percent silica based on the total weight of the nanoparticle dispersion.

A fourth aspect includes either of the second or third aspects where the silica nanoparticles have an average specific surface area of from 125 square meters per gram to 195 square meters per gram.

A fifth aspect includes any of the second through fourth aspects where the nanoparticle dispersion is oxy chloride stabilized.

A sixth aspect includes the fifth aspect where the activator comprises one or more of poly(2-hydroxypropyl-1-N-dimethyl ammonium chloride), poly(2-hydroxypropyl-1-1-N-dimethyl ammonium chloride), poly[N-(dimethylaminomethyl)]-acrylamide, poly(2-vinylimidazolinium bisulfate), poly(diallyldimethylammoniumchloride), or poly(N-dimethylaminopropyl)-methacrylamide.

A seventh aspect includes any of the second through fourth aspects where the silica nanoparticles are modified by a cationic modifier.

An eighth aspect includes the seventh aspect where the cationic modifier comprises one or more of an aluminum oxide, an aluminum sulfate, iron chloride, an iron sulfate, a cationic polymer, or combinations of these cationic modifiers.

A ninth aspect includes either of the seventh or the eighth aspect where the cationic modifier comprises a cationic polymer having at least one positively charged center.

A tenth aspect includes the ninth aspect where the cationic polymer comprises one or more of poly(2-hydroxypropyl-1-N-dimethylammonium chloride), poly(2-dimethylamino) ethyl methacrylate) methyl chloride quaternary salt, quaternized poly(N-dimethylaminopropyl)-methacrylamide, poly (2-hydroxypropyl-1-1-N-dimethylammoniumchloride), poly[N-(dimethylaminomethyl)]-acrylamide, or poly(2-vinylimidazolinium bisulfate).

An eleventh aspect includes any of the seventh through the tenth aspects where the activator comprises one or more ionic strength modifiers.

A twelfth aspect includes any of the first through eleventh aspects where an initial viscosity of the treatment fluid is less than or equal to 10 centipoise.

In a thirteenth aspect of the present disclosure, a method for acid diversion during an acid stimulation of a subterranean formation includes introducing a treatment fluid to the subterranean formation, the treatment fluid comprising an acidizing fluid, a nanoparticle dispersion, and an activator, where a temperature of the subterranean formation causes interaction of the activator with the nanoparticle dispersion to increase the viscosity of the treatment fluid to create a barrier operable to divert subsequent fluids to other regions of the subterranean formation.

A fourteenth aspect includes the thirteenth aspect and further includes passing an acidizing fluid into the subterranean formation after the treatment fluid, where the acidizing fluid is diverted to less permeable regions of the subterranean formation by the barrier formed by the treatment fluid.

A fifteenth aspect includes either of the thirteenth or fourteenth aspects where the viscosity of the treatment fluid during the introducing step is less than or equal to 10 centipoise.

A sixteenth aspect includes the fourteenth aspect where the viscosity of the treatment fluid during the diverting step is greater than or equal to 200 centipoise.

A seventeenth aspect includes any of the thirteenth through sixteenth aspects where the nanoparticle dispersion comprises an aqueous dispersion of silica nanoparticles.

An eighteenth aspect includes the seventeenth aspect where the nanoparticle dispersion comprises from 1 weight percent to 50 weight percent silica based on the total weight of the nanoparticle dispersion.

A nineteenth aspect includes any of the thirteenth through eighteenth aspects and further includes removing the treatment fluid from the subterranean formation, where a pH of the treatment fluid inhibits interaction of the activator with the nanoparticle dispersion to decrease the viscosity of the treatment fluid.

A twentieth aspect includes the nineteenth aspect where the viscosity of the treatment fluid during the removing step is less than or equal to 50 centipoise.

It should now be understood that various aspects of the compositions and methods for acid diversion during an acid stimulation treatment of a subterranean formation are described and such aspects may be utilized in conjunction with various other aspects.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A treatment fluid for acid diversion during an acid stimulation of a subterranean formation, the treatment fluid comprising:
    from 40 weight percent to 70 weight percent aqueous acidizing fluid based on the total weight of the treatment fluid;
    from 20 weight percent to 40 weight percent aqueous nanoparticle dispersion based on the total weight of the treatment fluid; and
    from 5 weight percent to 15 weight percent activator based on the total weight of the treatment fluid.

2. The treatment fluid of claim 1, where the nanoparticle dispersion comprises from 1 weight percent to 50 weight percent silica based on the total weight of the nanoparticle dispersion.

3. The treatment fluid of claim 1, where the silica nanoparticles have an average specific surface area of from 125 square meters per gram to 195 square meters per gram.

4. The treatment fluid of claim 1, where the nanoparticle dispersion is oxy chloride stabilized.

5. The treatment fluid of claim 4, where the activator comprises one or more of poly(2-hydroxypropyl-1-N-dimethyl ammonium chloride), poly(2-hydroxypropyl-1-1-N-dimethyl ammonium chloride), poly[N-(dimethylaminomethyl)]-acrylamide, poly(2-vinylimidazolinium bisulfate), poly(diallyldimethylammoniumchloride), or poly(N-dimethylaminopropyl)-methacrylamide.

6. The treatment fluid of claim 1, where the silica nanoparticles are modified by a cationic modifier.

7. The treatment fluid of claim 6, where the cationic modifier comprises one or more of an aluminum oxide, an aluminum sulfate, iron chloride, an iron sulfate, a cationic polymer, or combinations of these cationic modifiers.

8. The treatment fluid of claim 6, where the cationic modifier comprises a cationic polymer having at least one positively charged center.

9. The treatment fluid of claim 8, where the cationic polymer comprises one or more of poly(2-hydroxypropyl-1-N-dimethylammonium chloride), poly(-dimethylamino) ethyl methacrylate) methyl chloride quaternary salt, quaternized poly(N-dimethylaminopropyl)-methacrylamide, poly (2-hydroxypropyl-1-1-N-dimethylammoniumchloride), poly[N-(dimethylaminomethyl) ]-acrylamide, or poly(-vinylimidazolinium bisulfate).

10. The treatment fluid of claim 6, where the activator comprises one or more ionic strength modifiers.

11. The treatment fluid of claim 1, where an initial viscosity of the treatment fluid is less than or equal to 10 centipoise.

12. A treatment fluid for acid diversion during an acid stimulation of a subterranean formation, the treatment fluid comprising:
    from 40 weight percent to 70 weight percent acidizing fluid based on the total weight of the treatment fluid;
    from 20 weight percent to 40 weight percent nanoparticle dispersion based on the total weight of the treatment fluid; and
    from 5 weight percent to 15 weight percent activator based on the total weight of the treatment fluid, wherein the activator comprises one or more of poly(2-hydroxypropyl-1-N-dimethyl ammonium chloride), poly(2-hydroxypropyl-1-1-N-dimethyl ammonium chloride), poly[N-(dimethylaminomethyl)]-acrylamide, poly(2-vinylimidazolinium bisulfate), poly(diallyldimethylammoniumchloride), or poly(N-dimethylaminopropyl)-methacrylamide.

13. The treatment fluid of claim 12, where the silica nanoparticles are modified by a cationic modifier comprising a cationic polymer having at least one positively charged center.

14. A method for acid diversion during an acid stimulation of a subterranean formation, the method comprising:
    introducing a treatment fluid to the subterranean formation, the treatment fluid comprising:

from 40 weight percent to 70 weight percent aqueous acidizing fluid based on the total weight of the treatment fluid, from 20 weight percent to 40 weight percent aqueous nanoparticle dispersion based on the total weight of the treatment fluid, and from 5 weight percent to 15 weight percent activator based on the total weight of the treatment fluid, where a temperature of the subterranean formation causes interaction of the activator with the nanoparticle dispersion to increase the viscosity of the treatment fluid to create a barrier operable to divert subsequent fluids to other regions of the subterranean formation.

15. The method of claim 14, further comprising passing an acidizing fluid into the subterranean formation after the treatment fluid, where the acidizing fluid is diverted to less permeable regions of the subterranean formation by the barrier formed by the treatment fluid.

16. The method of claim 15, where the viscosity of the treatment fluid during the introducing step is less than or equal to 10 centipoise.

17. The method of claim 15, where the viscosity of the treatment fluid during the diverting step is greater than or equal to 200 centipoise.

18. The method of claim 14, where the nanoparticle dispersion comprises from 1 weight percent to 50 weight percent silica based on the total weight of the nanoparticle dispersion.

19. The method of claim 14, further comprising removing the treatment fluid from the subterranean formation, where a pH of the treatment fluid inhibits interaction of the activator with the nanoparticle dispersion to decrease the viscosity of the treatment fluid.

20. The method of claim 19, where the viscosity of the treatment fluid during the removing step is less than or equal to 50 centipoise.

* * * * *